(No Model.)
J. R. HUGHES.
Egg Beater.
No. 235,245.                    Patented Dec. 7, 1880.
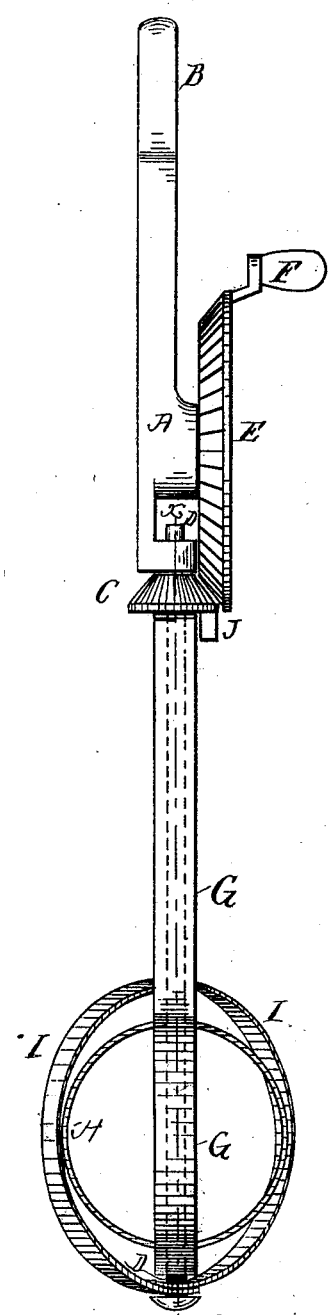
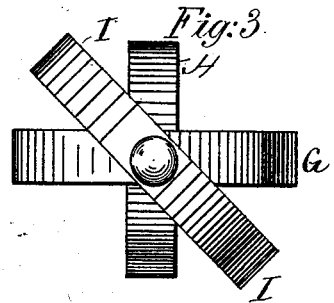
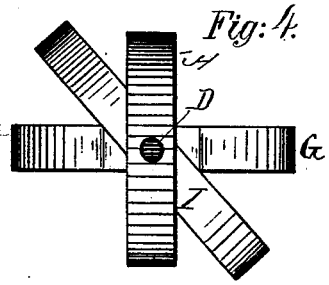
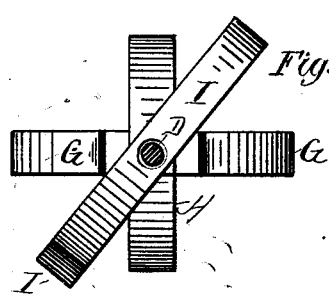
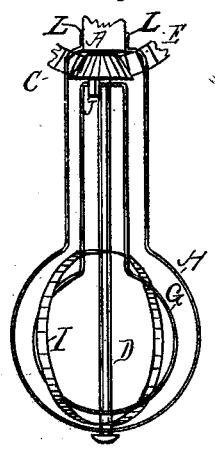
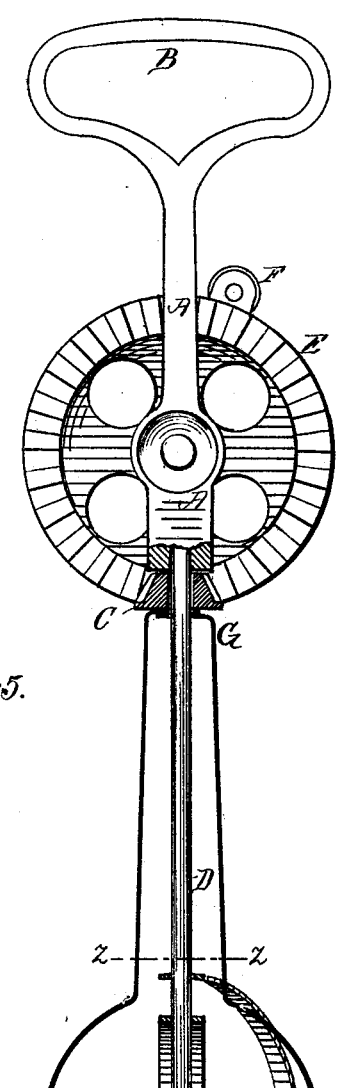
Witnesses:
N. S. Bellows
F. N. Archer
Inventor,
J. R. Hughes,
Per Brown Bros.
Attorneys
N. PETERS, PHOTO-LITHOGRAPHER, WASHINGTON, D. C.

UNITED STATES PATENT OFFICE.

JAMES R. HUGHES, OF SAUGUS, MASSACHUSETTS.

EGG-BEATER.

SPECIFICATION forming part of Letters Patent No. 235,245, dated December 7, 1880.

Application filed November 3, 1880. (No model.)

*To all whom it may concern:*

Be it known that I, JAMES R. HUGHES, of Saugus, in the county of Essex and State of Massachusetts, have invented certain new and useful Improvements in Egg-Beaters, of which the following is a full, clear, and exact description.

This improved egg-beater, in substance, is composed of an annular or ring-shaped revolving float or blade operated by any suitable driving mechanism, in combination, first, with a loose annular or ring-shaped float or blade which is arranged in relation to the revolving float to be carried around, and with it as the same is driven around; and, second, with a fixed annular or ring-shaped float or blade which is arranged in such relation to the line of movement of the revolving float that the revolving float will pass by and around the same, and with a loose annular or ring-shaped float or blade which is arranged in relation to the revolving float to be carried around by and with it as the same is driven around.

In the accompanying plate of drawings my improved egg-beater is illustrated.

Figure 1 is a side elevation of the same; Fig. 2, a longitudinal section on line $x\ x$, Fig. 1; Fig. 3, a view of the outside end of the floats; Figs. 4 and 5, sectional views on lines $y\ y$ and $z\ z$, respectively; Fig. 6, a side elevation, showing a modification in the relative arrangement of the several floats, which will be hereinafter particularly described.

In the drawings, A represents the stock of the egg-beater. This stock at one end has a handle, B, and at the other end a pinion gear-wheel, C, arranged to turn upon a spindle or rod, $D$, which is a continuation of the stock A, and adapted to be driven by a larger gear-wheel, E, arranged to turn upon the stock A, and provided with a handle, F, for convenience in driving it, and thus through it the pinion gear-wheel C.

G, H, and I are annular or ring-shaped floats or blades.

The float G is arranged to revolve about the spindle D, and for that purpose it is hung to the outer end of the pinion gear-wheel C by a lug or lugs, J, on the same, or in any suitable manner, so that the turning of the pinion will drive the float G around and about the spindle D as a center.

The float H is rigidly secured to the spindle D, and it may be either within or outside of the plane of revolution of the revolving float G. The first location of it is shown in all the figures except Fig. 6, and the second location is shown in that figure, in which figure it is rigidly secured to the stock A, as shown at L in said figure, or it can be secured to the spindle D between the gear C and stock A.

The float I is loose upon the spindle D, and passes between the arms of the float, adapted to be driven by the gears C E, as before described.

With the several floats arranged as above described, the driving of the float G, by operating the gears C E, causes such float, first, to be carried around and about the stationary float H, and, second, to carry around with it the loose float I, and thus the beating of an egg is obviously secured. This result may be similarly secured by the combination, simply, with the revolving float, of either the loose or the fixed float; but it is preferable that the three floats should be combined, as above described.

Again, it will be seen that the two floats are driven directly by and through one pinion-wheel.

Having thus described my invention, what I claim, and desire to secure by Letters Patent, is—

1. The revolving float G and loose float I, arranged and combined together in one implement, substantially as and for the purpose described.

2. The revolving float G and stationary float H and loose float I, arranged and combined together in one implement, substantially as and for the purpose described.

3. An egg-beater having two floats, to be operated by a single pinion gear-wheel, C, substantially as and for the purpose described.

In testimony whereof I have hereunto set my hand in the presence of two subscribing witnesses.

JAMES R. HUGHES.

Witnesses:
NATHAN A. TAYLOR,
WM. S. BELLOWS.